(12) United States Patent
Kim et al.

(10) Patent No.: US 9,678,385 B2
(45) Date of Patent: Jun. 13, 2017

(54) APPARATUS FOR MANUFACTURING ALIGNMENT LAYER, AND METHOD OF MANUFACTURING LIQUID CRYSTAL DISPLAY DEVICE BY USING THE SAME

(71) Applicant: Samsung Display Co., Ltd., Yongin-si (KR)

(72) Inventors: Tae Ho Kim, Asan-si (KR); Sun-Kyu Joo, Suwon-si (KR); Ji-Yoon Jung, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/985,377

(22) Filed: Dec. 30, 2015

(65) Prior Publication Data

US 2016/0320645 A1    Nov. 3, 2016

(30) Foreign Application Priority Data

Apr. 29, 2015  (KR) .................. 10-2015-0060545

(51) Int. Cl.
| | | |
|---|---|---|
| *G02F 1/13* | (2006.01) | |
| *G02F 1/1337* | (2006.01) | |
| *B29D 16/00* | (2006.01) | |

(52) U.S. Cl.
CPC ........... *G02F 1/1337* (2013.01); *B29D 16/00* (2013.01); *G02F 1/1303* (2013.01)

(58) Field of Classification Search
CPC .... G02F 1/1337; G02F 1/1303; G02F 1/1333; G02F 1/133; G02F 1/133351; B29D 16/00; H01L 51/56; H01L 51/5237
See application file for complete search history.

(56) References Cited

U.S. PATENT DOCUMENTS

| | | | | |
|---|---|---|---|---|
| 7,963,757 B2* | 6/2011 | Lee | ...................... | H01L 51/0004 101/214 |
| 2002/0047560 A1* | 4/2002 | Lee | ...................... | H01L 51/0004 315/169.3 |

(Continued)

FOREIGN PATENT DOCUMENTS

| | | |
|---|---|---|
| KR | 1020080061202 | 7/2008 |
| KR | 1020060134694 | 9/2008 |
| KR | 1020080082077 | 9/2008 |

OTHER PUBLICATIONS

Machine translation of cited references KP 1020060134694 A, KP 1020080061202 A, KP 1020080082077.*

*Primary Examiner* — Nimeshkumar Patel
*Assistant Examiner* — Jose M Diaz
(74) *Attorney, Agent, or Firm* — Cantor Colburn LLP

(57) ABSTRACT

An apparatus for manufacturing an alignment layer includes: a dispenser which supplies an alignment material; an anilox roll, onto which the alignment material supplied from the dispenser is applied; a printing roll which is engaged and rotated with the anilox roll; and a resin plate attached to an outer peripheral surface of the printing roll, where the resin plate receives the alignment material applied onto the anilox roll and prints the alignment material to a targeted substrate, in which the resin plate comprises a first area and a second area surrounding the first area, first convex portions and first concave portions are disposed in the first area, second convex portions and second concave portions are disposed in the second area, and an area of each second convex portion is larger than an area of each first convex portion.

18 Claims, 7 Drawing Sheets

(56) References Cited

U.S. PATENT DOCUMENTS

| | | | |
|---|---|---|---|
| 2002/0126247 A1* | 9/2002 | Hasegawa | G02F 1/133711 349/149 |
| 2004/0185188 A1* | 9/2004 | Amano | B41C 1/00 428/1.51 |
| 2013/0337243 A1* | 12/2013 | Ishikawa | A47K 10/16 428/211.1 |
| 2016/0144394 A1* | 5/2016 | Zheng | B05C 1/00 118/200 |

* cited by examiner

APPARATUS FOR MANUFACTURING ALIGNMENT LAYER, AND METHOD OF MANUFACTURING LIQUID CRYSTAL DISPLAY DEVICE BY USING THE SAME

This application claims priority to Korean Patent Application No. 10-2015-0060545 filed on Apr. 29, 2015, and all the benefits accruing therefrom under 35 U.S.C. §119, the content of which in its entirety is herein incorporated by reference.

BACKGROUND (a) Field

Exemplary embodiments of the invention relate to an apparatus for manufacturing an alignment layer, and a method of manufacturing a liquid crystal display device using the apparatus.

(b) Description of the Related Art

A liquid crystal display, which is one of the most widely used types of flat panel display, typically includes two sheets of display panels with field generating electrodes such as a pixel electrode and a common electrode formed therein, and a liquid crystal layer interposed therebetween.

The liquid crystal display may generate electric fields in the liquid crystal layer by applying voltage to the field generating electrodes, and determine the direction of liquid crystal molecules of the liquid crystal layer by the generated electric field, thus controlling polarization of incident light to display images.

SUMMARY

An alignment layer for aligning liquid crystal molecules of a liquid crystal layer is typically provided in a liquid crystal display device. When a pin hole or a defect occurs due to an alignment error or the like during a process of forming the alignment layer, the alignment layer is typically removed and then formed again. When a thickness of the alignment layer is not uniform, the alignment may not be completely removed during such a process of removing the alignment layer, and thus, a defect may occur again when the alignment layer is formed again.

Exemplary embodiment of the invention relate to an apparatus for manufacturing an alignment layer, which is capable of uniformly forming an alignment layer, and a method of manufacturing a liquid crystal display device using an apparatus for manufacturing an alignment layer.

An exemplary embodiment of the invention provides an apparatus for manufacturing an alignment layer, including: a dispenser which supplies an alignment material; an anilox roll, onto which the alignment material supplied from the dispenser is applied; a printing roll which is engaged and rotated with the anilox roll; and a resin plate attached to an outer peripheral surface of the printing roll, where the resin plate receives the alignment material applied onto the anilox roll and prints the alignment material to a targeted substrate, in which the resin plate comprise a first area and a second area surrounding the first area, a plurality of first convex portions and a plurality of first concave portions are disposed in the first area, a plurality of second convex portions and a plurality of second concave portions are disposed in the second area, and an area of each second convex portion is larger than an area of each first convex portion when viewed from a top view.

In an exemplary embodiment, the area of each second convex portion may be larger than the area of each first convex portion by about 1.25 times to about 2.2 times.

In an exemplary embodiment, the first convex portions may be connected with the first concave portions, and the second convex portions may be connected with the second concave portions.

In an exemplary embodiment, a sum of a diameter of each first convex portion and a diameter of each first concave portion may be equal to about a sum of a diameter of each second convex portion and a diameter of each second concave portion.

In an exemplary embodiment, the diameter of each second convex portion may be larger than the diameter of each first convex portion, and a height of each second convex portion may be equal to about a height of each first convex portion.

In an exemplary embodiment, the diameter of each first concave portion may be larger than the diameter of each second concave portion, and a depth of each first concave portion may be equal to about a depth of each second concave portion.

In an exemplary embodiment, the apparatus may further include: a doctor roll which is engaged and rotated with the anilox roll, where the doctor roll uniformly spreads the alignment material applied onto the anilox roll; and a printing table, on which the targeted substrate is seated.

Another exemplary embodiment of the invention provides a method of manufacturing a liquid crystal display device, including: providing an alignment layer on a surface of a first substrate, on which a display area displaying an image and a peripheral area surrounding the display area are defined, using an apparatus for manufacturing the alignment layer; bonding a second substrate, on which the alignment layer is formed, and the first substrate; and forming a liquid crystal layer between the first substrate and the second substrate. In such an embodiment, the apparatus for manufacturing the alignment layer includes: a dispenser which supplies an alignment material; an anilox roll, onto which the alignment material supplied from the dispenser is applied; a printing roll which is engaged and rotated with the anilox roll, a resin plate attached to an outer peripheral surface of the printing roll, where the resin plate receives the alignment material applied onto the anilox roll and print the alignment material to the surface of the first substrate; and a printing table, on which the first substrate is seated. In such an embodiment, the resin plate comprises a first area and a second area surrounding the first area, a plurality of first convex portions and a plurality of concave portions are disposed in the first area, a plurality of second convex portions and a plurality of second concave portions are disposed in the second area, and an area of each second convex portion is larger than an area of each first convex portion.

In an exemplary embodiment, the forming the alignment layer on the surface of the first substrate may include: seating the first substrate on the printing table; applying the alignment material onto the anilox roll; transferring the alignment material applied onto the anilox roll to the resin plate; printing the alignment material transferred to the resin plate to the surface of the first substrate; uniformly spreading the printed alignment material on the first substrate; and curing the alignment material printed on the first substrate.

In an exemplary embodiment, the first area may correspond to the display area, and the second area may correspond to the peripheral area.

In an exemplary embodiment, the transferring the alignment material applied onto the anilox roll to the resin plate may include transferring the alignment material applied onto the anilox roll to the plurality of first concave portions and the plurality of second concave portions, in which an amount of the alignment material transferred to each first concave portion may be larger than an amount of the alignment material transferred to each second concave portion.

In an exemplary embodiment, the printing the alignment material transferred to the resin plate to the surface of the first substrate may include printing the alignment material positioned in the plurality of first concave portions on the display area, and printing the alignment material positioned in the plurality of second concave portions on the peripheral area.

In an exemplary embodiment, the alignment material printed on the surface of the first substrate is in a drop shape, and a size of the drop shape of the alignment material printed on the display area is larger than a size of the drop shape of the alignment material printed on the peripheral area.

According to exemplary embodiment of the invention, an alignment material is uniformly spread on a surface of a substrate by printing the alignment material having larger drops in a display area, than drops printed in a peripheral area surrounding the display area by using the alignment layer manufacturing apparatus including first concave portions and second concave portions, by which the amount of the alignment material may be differently transferred to a resin plate to which the alignment material is transferred. Accordingly, the alignment layer having a uniform thickness may be formed on the surface of the substrate.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

Figure 1:
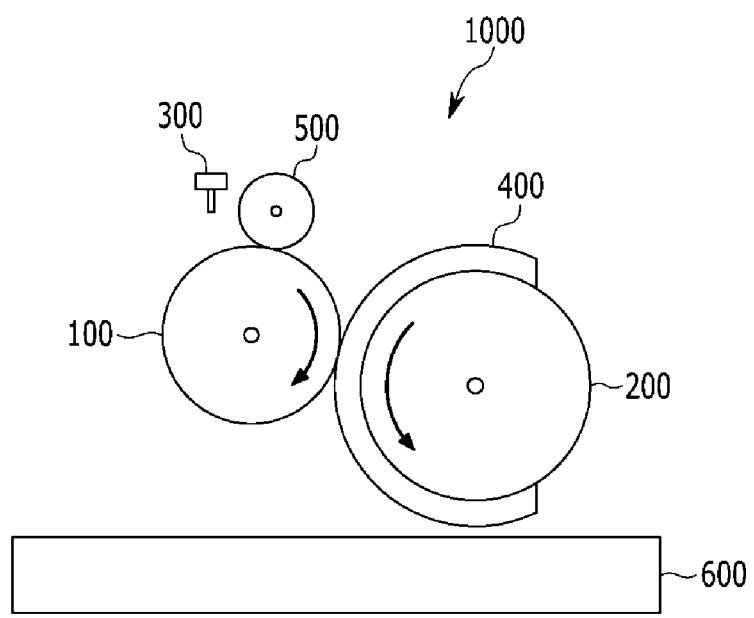
FIG. 1 is a diagram schematically illustrating an alignment layer manufacturing apparatus according to an exemplary embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In addition, the size and thickness of each configuration shown in the drawings are arbitrarily shown for understanding and ease of description, but the invention is not limited thereto.

In the drawings, the thickness of layers, films, panels, regions, etc., are exaggerated for clarity. In the drawings, for convenience of the description, thicknesses of some layers and areas are exaggerated. It will be understood that when an element such as a layer, film, region, or substrate is referred to as being "on" another element, it can be directly on the other element or intervening elements may also be present.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Further, throughout the specification, the term "according to a plane" or "viewed from a top plan view" means a case where a target portion is viewed from the above, and the term "according to a cross section" or "viewed from a cross-sectional view" means a case where a cross section taken by vertically cutting a target portion is viewed from the side.

FIG. 1 is a diagram schematically illustrating an alignment layer manufacturing apparatus according to an exemplary embodiment of the invention.

Referring to FIG. 1, an alignment layer manufacturing apparatus 1000, according to the exemplary embodiment, includes three rollers 100, 200 and 500, which are engaged with each other, a dispenser 300, and a printing table 600.

The three rollers 100, 200 and 500 include an anilox roll 100, onto which an alignment material is applied, a printing roll 200 engaged with the anilox roll 100, and a doctor roll 500 engaged with the anilox roll 100.

The dispenser 300 is positioned on the anilox roll 100, and configured to drops the alignment material to an outer peripheral surface of the anilox roll 100.

The doctor roll 500 is rotated while being engaged with the anilox roll 100, and configured to uniformly spread the alignment material on the outer peripheral surface of the anilox roll 100.

In such an embodiment, alignment layer manufacturing apparatus 1000 further includes a resin plate 400 attached to an outer peripheral surface of the printing roll 200. The resin plate 400 prints the alignment material applied onto the outer peripheral surface of the anilox roll 100 on a targeted substrate. When the resin plate 400 is in contact with the outer peripheral surface of the anilox roll 100, the alignment material applied onto the outer peripheral surface of the anilox roll 100 is transferred to the resin plate 400, and the alignment material transferred to the resin plate 400 when the printing roll 200 is rotated is printed on the targeted substrate.

The printing table 600 may be mounted with the targeted substrate, on which the alignment material is printed, and move in a vertical direction to an axis of the printing roll 200.

In such an embodiment, the alignment layer manufacturing apparatus 1000 may further include a bucket (not illustrated) positioned under the anilox roll 100. The bucket collects the alignment material dropped from the anilox roll 100 while the doctor roll 500 uniformly spreads the alignment material applied onto the outer peripheral surface of the anilox roll 100.

Hereinafter, the resin plate will be described in detail with reference to FIGS. 2 to 4.

Figure 2:
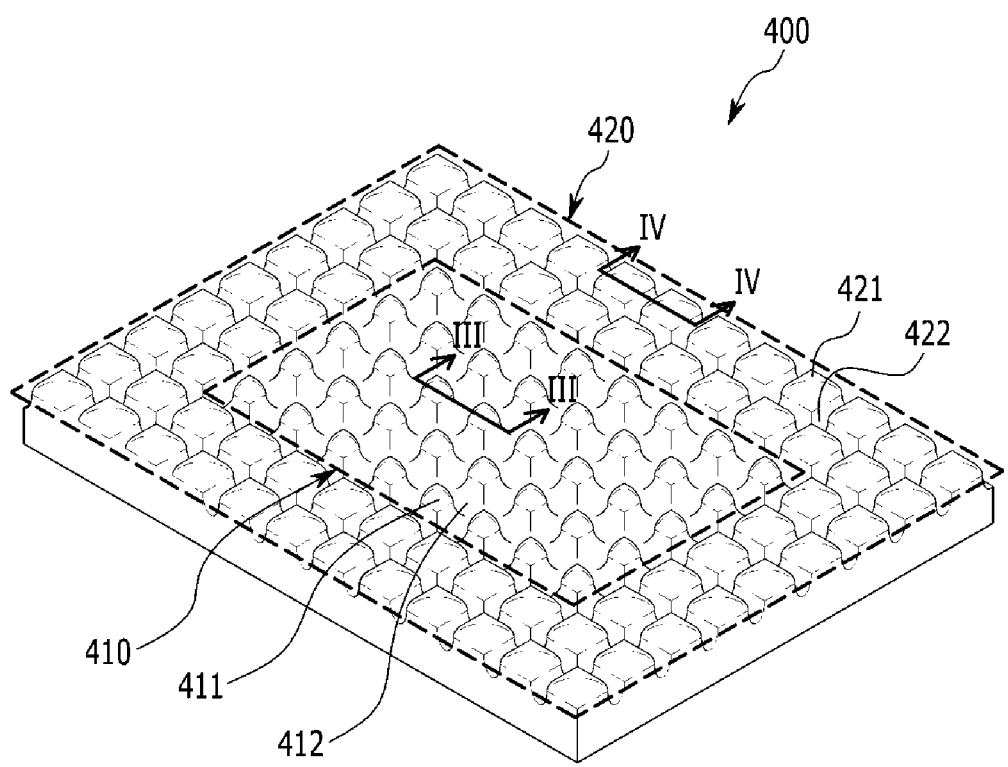
FIG. 2 is a diagram schematically illustrating a resin plate according to an exemplary embodiment of the invention.

FIG. 2 is a diagram schematically illustrating the resin plate according to an exemplary embodiment of the invention. FIG. 3 is a schematical cross-sectional view taken along line III-III of FIG. 2. FIG. 4 is a schematical cross-sectional view taken along line IV-IV of FIG. 2.

Figure 3:
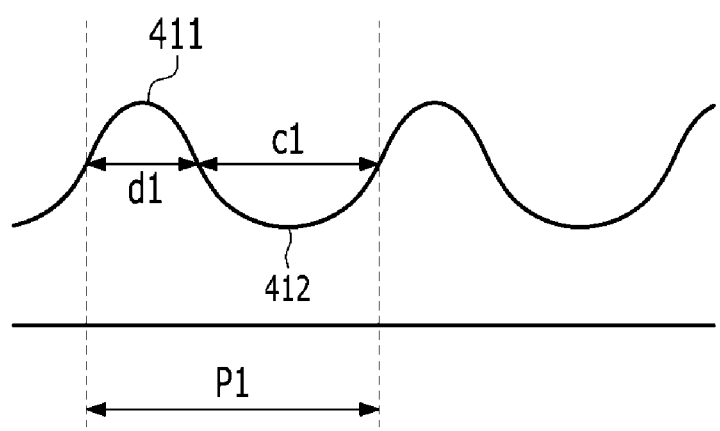
FIG. 3 is a schematical cross-sectional view taken along line III-III of FIG. 2.
Figure 4:
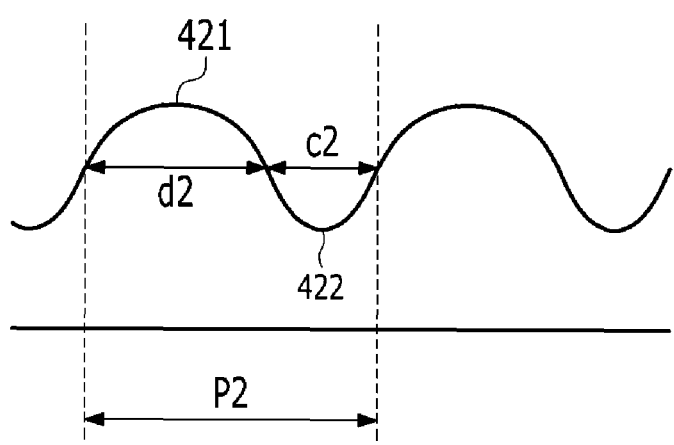
FIG. 4 is a schematical cross-sectional view taken along line IV-IV of FIG. 2.
Figure 5:
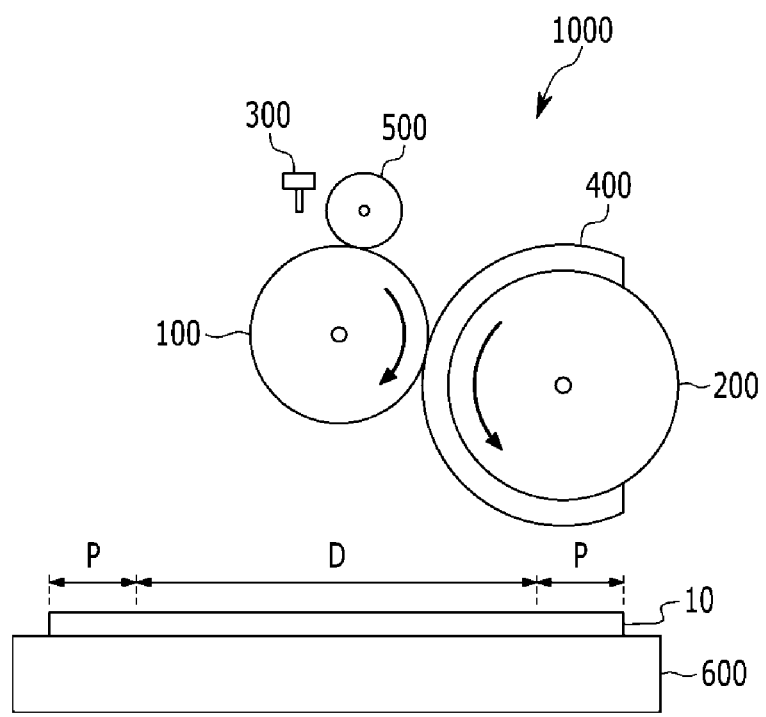
FIGS. 5 to 9 are diagrams illustrating a method of manufacturing a liquid crystal display device, according to an exemplary embodiment of the invention.
Figure 6:
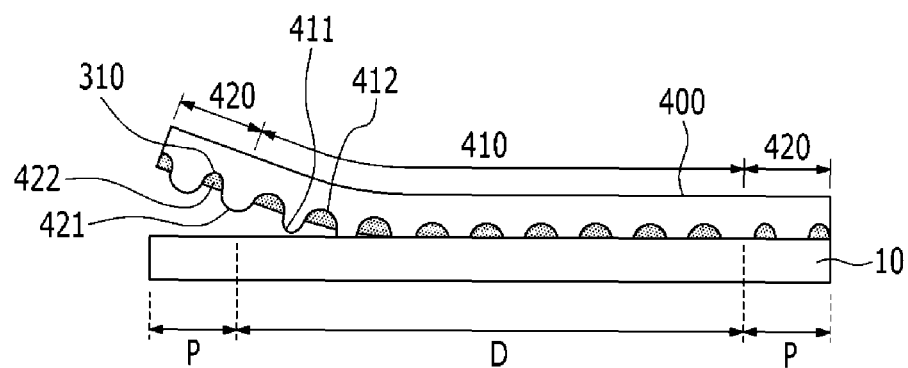
Figure 7:
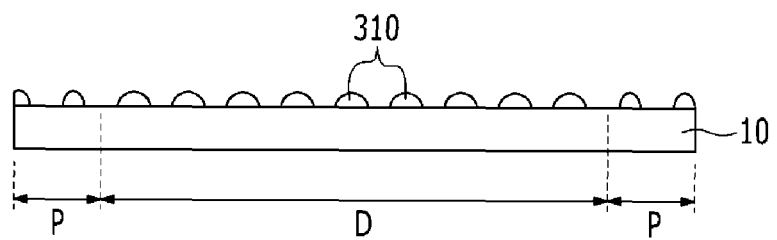
Figure 8:
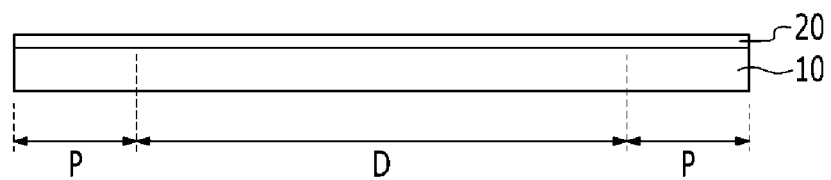

Referring to FIGS. 2 to 4, an exemplary embodiment of the resin plate 400 includes a first area 410 and a second area 420 surrounding the first area 410. The resin plate 400 may have a quadrangular shape, and the second area 420 is positioned at an edge of the resin plate 400. The second area 420 may be an area spaced apart from each of four lateral sides or surfaces of the resin plate 400 by about 100 micrometers (μm) to about 1,000 μm.

A plurality of first convex portions 411 and a plurality of first concave portions 412 are defined or disposed in the first area 410. In such an embodiment, the first convex portions 411 and the first concave portions 412 may be alternately and uniformly disposed in the first area 410. The first convex portions 411 and the first concave portions 412 are connected with each other. In such an embodiment, the first convex portions 411 and the first concave portions 412 may define a pattern, in which a first convex portion 411 and a first concave portion 412 adjacent to and connected with the first convex portion 411 are repeatedly disposed.

A plurality of second convex portions 421 and a plurality of second concave portions 422 are defined or disposed in the second area 420. In such an embodiment, the second convex portions 421 and the second concave portions 422 may be alternately and uniformly disposed in the second area 420. The second convex portions 421 and the second concave portions 422 are connected with each other. In such an embodiment, the second convex portions 421 and the second concave portions 422 may define a pattern, in which a second convex portion 421 and a second concave portion 422 adjacent to and connected with the second convex portion 421 are repeatedly disposed.

The first convex portions 411, the first concave portions 412, the second convex portions 421 and the second concave portions 422 are positioned on a surface, e.g., a same surface, of the resin plate 400, and are in contact with the anilox roll 100. An opposite surface of the surface of the resin plate 400 is in contact with the printing roll 200. In an exemplary embodiment, when the alignment material applied onto the outer peripheral surface of the anilox roll 100 is transferred to the resin plate 400, the alignment material is positioned in the first concave portions 412 and the second concave portions 422.

Here, a length of a sum of a diameter d1 of one first convex portion 411 and a diameter c1 of one first concave portion 412 is referred to as a first pitch P1, and a length of a sum of a diameter d2 of one second convex portion 421 and a diameter c2 of one second concave portion 422 is referred to as a second pitch P2. In an exemplary embodiment, the first pitch P1 is substantially the same as or equal to about the second pitch P2.

In an exemplary embodiment, the diameter d1 of the first convex portion 411 is smaller than the diameter d2 of the second convex portion 421, and a height of the first convex portion 411 is substantially the same as or equal to about a height of the second convex portion 421. Herein, a height of the first or second convex portion 411 or 412 may be defined as a height of a peak thereof from a bottom surface of the resin plate 400 or a thickness of the resin plate 400 at a peak thereof. In an exemplary embodiment, the diameter c1 of the first concave portion 412 is larger than the diameter c2 of the second concave portion 422, and a depth of the first concave portion 412 is the same as a depth of the second concave portion 422. In such an embodiment, an area of one second convex portion 421 is larger than an area of the first convex portion 411.

In such an embodiment, the first pitch P1 is substantially the same as or equal to about the second pitch P2, and thus an area of one second convex portion 421 is larger than an area of the first convex portion 411, and an area of one first concave portion 412 is larger than an area of the second concave portion 422 when viewed from a top view. In one exemplary embodiment, for example, the area of one second convex portion 421 is larger than the area of the first convex portion 411 by about 1.25 times to about 2.2 times when viewed from a top view.

Accordingly, in an exemplary embodiment, when the alignment material applied onto the outer peripheral surface of the anilox roll 100 is transferred to the resin plate 400, the amount of alignment material positioned in one first concave portion 412 is larger than the amount of alignment material positioned in one second concave portion 422.

In such an embodiment, where the first pitch P1 is substantially the same as or equal to about the second pitch P2, the number of first convex portions 411 and first concave portions 412 in a unit area is substantially the same as or equal to about the number of second convex portions 421 and second concave portions 422 in the unit area.

Hereinafter, an exemplary embodiment of a method of manufacturing a liquid crystal display device using the alignment layer manufacturing apparatus will be described in detail with reference to FIGS. 5 to 9.

FIGS. 5 to 9 are diagrams illustrating a method of manufacturing a liquid crystal display device, according to an exemplary embodiment of the invention Referring to FIGS. 5 to 8, a first substrate 10 is disposed or seated on the printing table 600 of the alignment layer manufacturing apparatus 1000. Here, the first substrate 10 includes a display area D for displaying an image and a peripheral area P surrounding the display area D. In such an embodiment, the alignment layer manufacturing apparatus 1000 is substantially the same as the exemplary embodiments of the alignment layer manufacturing apparatus 1000 described above with reference to FIGS. 1 to 4.

In such an embodiment, a plurality of thin film layers may be positioned on a surface of the first substrate 10. In such an embodiment, the thin film layers may include a plurality of thin film transistors, a plurality of data lines, a plurality of gate lines, a plurality of pixel electrodes, and the like.

In an alternative embodiment, the thin film layers may include a plurality of thin film transistors, a plurality of data lines, a plurality of gate lines, a plurality of pixel electrodes, a common electrode, and color filters, and the like.

An alignment material is supplied from the dispenser 300 to the anilox roll 100 after the first substrate 10 is seated on the printing table 600, and the alignment material 310 supplied to the anilox roll 100 is transferred to the resin plate 400 by the rotation of the anilox roll 100. In one exemplary embodiment, for example, the alignment material 310 may be an organic alignment material, such as a polyimide-based alignment material, or an inorganic alignment material.

When the alignment material 310 is transferred to the resin plate 400, the alignment material 310 is positioned in the first concave portions 412 and the second concave portions 422. In such an embodiment, an area of one first concave portion 412 is larger than an area of one second concave portion 422, such that the amount of alignment material 310 positioned in one first concave portion 412 is larger than the amount of alignment material 310 positioned in one second concave portion 422.

Then, the resin plate 400 is in contact with a surface of the first substrate 10 positioned under the printing roll 200, and the alignment material transferred to the resin plate 400 by the rotation of the printing roll 200 is printed on the surface of the first substrate 10. In such an embodiment, the first area 410 of the resin plate 400 may correspond to the display area D of the first substrate 10, and the second area 420 of the resin plate 400 may correspond to the peripheral area P of the first substrate 10. Accordingly, the alignment material 310 transferred to the first area 410 of the resin plate 400 is printed on the display area D of the first substrate 10, and the alignment material 310 transferred to the second area 420 of the resin plate 400 is printed on the peripheral area P of the first substrate 10.

In an exemplary embodiment, the alignment material 310 may be transferred and printed in a liquid state. In such an embodiment, the alignment material 310 may be printed on the first substrate 10 in a form of a plurality of drops. A size of the drop of each alignment material 310 printed on the display area D of the first substrate 10 may be larger than a size of the drop of each alignment material 310 printed on the peripheral area P of the first substrate 10.

In an exemplary embodiment, the alignment material 310 printed on the first substrate 10 is spread to the surrounding area to be flat, and undergoes a thermal setting or photo-curing process to form an alignment layer 20. In such an embodiment, where the alignment material 310 is spread to the surrounding area, the size of the drop of the alignment material 310 printed on the peripheral area P is smaller than the size of the drop of the alignment material 310 printed on the display area D, to effectively prevent the alignment material 310 from being excessively collected to the peripheral area P. Accordingly, in such an embodiment, the printed alignment material 310 is uniformly spread on the surface of the first substrate 10.

In an exemplary embodiment, as described above, when the alignment material 310 is printed on the first substrate 10, the printed alignment material 310 may be uniformly spread on a surface of the first substrate 10 by printing the alignment material 310 having larger drops than those of the peripheral area P surrounding the display area D on the display area D. Accordingly, the alignment layer 20 having a uniform thickness may be formed on the surface of the first substrate 10.

Figure 9:
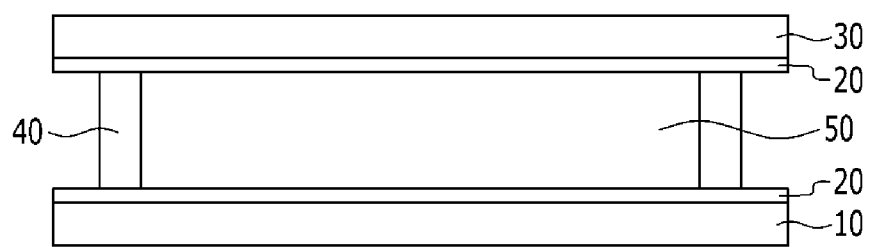

Referring to FIG. 9, in an exemplary embodiment, the alignment layer 20 is further formed on a surface of a second substrate 30, and then the first substrate 10 and the second substrate 30 are bonded using a sealant 40. In such an embodiment, a liquid crystal layer 50 is provided between the first substrate 10 and the second substrate 30.

In an exemplary embodiment, the alignment layer 20 may be formed on the second substrate 30 by substantially the same method as the method of forming the alignment layer 20 on the first substrate 10. In such an embodiment, a thin film layers including a color filter, a light blocking member or a common electrode may be provided between the second substrate 30 and the alignment layer 20.

In an exemplary embodiment, the liquid crystal layer 50 may be formed by bonding the first substrate 10 and the second substrate 30, and then injecting a liquid crystal material between the first substrate 10 and the second substrate 30. In an alternative exemplary embodiment, the liquid crystal layer 50 may be formed by dropping the liquid crystal material onto a surface of the first substrate 10 or the second substrate 30. In such an embodiment, after the liquid crystal layer 50 is formed on a surface of the first substrate 10 or the second substrate 30, the first substrate 10 and the second substrate 30 are bonded.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for manufacturing an alignment layer, the apparatus comprising:
   a dispenser which supplies an alignment material;
   an anilox roll, onto which the alignment material supplied from the dispenser is applied;
   a printing roll which is engaged and rotated with the anilox roll; and
   a resin plate attached to an outer peripheral surface of the printing roll, wherein the resin plate receives the alignment material applied onto the anilox roll and prints the alignment material to a targeted substrate, wherein the resin plate comprises:
a first area and a second area surrounding the first area,
a plurality of first convex portions and a plurality of first concave portions are disposed in the first area,
a plurality of second convex portions and a plurality of second concave portions are disposed in the second area, and
an area of each second convex portion is larger than an area of each first convex portion when viewed from a top view.

2. The apparatus of claim 1, wherein the area of each second convex portion is larger than the area of each first convex portion by about 1.25 times to about 2.2 times.

3. The apparatus of claim 2, wherein
the first convex portions are connected with the first concave portions, and
the second convex portions are connected with the second concave portions.

4. The apparatus of claim 3, wherein a sum of a diameter of each first convex portion and a diameter of each first concave portion is equal to about a sum of a diameter of each second convex portion and a diameter of each second concave portion.

5. The apparatus of claim 4, wherein
the diameter of each second convex portion is larger than the diameter of each first convex portion, and
a height of each second convex portion is equal to about a height of each first convex portion.

6. The apparatus of claim 5, wherein
the diameter of each first concave portion is larger than the diameter of each second concave portion, and
a depth of each first concave portion is equal to about a depth of each second concave portion.

7. The apparatus of claim 1, further comprising:
a doctor roll which is engaged and rotated with the anilox roll, wherein the doctor roll uniformly spreads the alignment material applied onto the anilox roll; and
a printing table, on which the targeted substrate is seated.

8. A method of manufacturing a liquid crystal display device, the method comprising:
providing an alignment layer on a surface of a first substrate, on which a display area for displaying an image and a peripheral area surrounding the display area are defined, using an apparatus for manufacturing the alignment layer;
bonding a second substrate, on which the alignment layer is formed, and the first substrate; and
providing a liquid crystal layer between the first substrate and the second substrate,
wherein the apparatus for manufacturing the alignment layer comprises:
a dispenser which supplies an alignment material;
an anilox roll, onto which the alignment material supplied from the dispenser is applied;
a printing roll which is engaged and rotated with the anilox roll;
a resin plate attached to an outer peripheral surface of the printing roll, wherein the resin plate receives the alignment material applied onto the anilox roll and prints the alignment material to a surface of the first substrate; and
a printing table, on which the first substrate is seated, and
wherein the resins plate comprises:
a first area and a second area surrounding the first area,
a plurality of first convex portions and a plurality of concave portions are disposed in the first area,
a plurality of second convex portions and a plurality of second concave portions are disposed in the second area, and
an area of each second convex portion is larger than an area of each first convex portion when viewed from a top view.

9. The method of claim 8, wherein the forming the alignment layer on the surface of the first substrate comprises:
seating the first substrate on the printing table;
applying the alignment material onto the anilox roll;
transferring the alignment material applied onto the anilox roll to the resin plate;
printing the alignment material transferred to the resin plate to the surface of the first substrate;
uniformly spreading the printed alignment material on the first substrate; and
curing the alignment material printed on the first substrate.

10. The method of claim 9, wherein
the first area corresponds to the display area, and
the second area corresponds to the peripheral area.

11. The method of claim 10, wherein
the transferring the alignment material applied onto the anilox roll to the resin plate comprises transferring the alignment material applied onto the anilox roll to the plurality of first concave portions and the plurality of second concave portions, and
wherein an amount of the alignment material transferred to each first concave portion is larger than an amount of the alignment material transferred to each second concave portion.

12. The method of claim 11, wherein the printing the alignment material transferred to the resin plate to the surface of the first substrate comprises:
printing the alignment material positioned in the plurality of first concave portions on the display area; and
printing the alignment material positioned in the plurality of second concave portions on the peripheral area.

13. The method of claim 12, wherein
the alignment material printed on the surface of the first substrate is in a drop shape, and
a size of the drop shape of the alignment material printed on the display area is larger than a size of the drop shape of the alignment material printed on the peripheral area.

14. The method of claim 13, wherein the area of each of the second convex portions is larger than the area of each of the first convex portion by about 1.25 times to about 2.2 times.

15. The method of claim 14, wherein
the first convex portions are connected with the first concave portions, and
the second convex portions are connected with the second concave portion.

16. The method of claim 15, wherein a sum of a diameter of each first convex portion and a diameter of each first concave portion is equal to about a sum of a diameter of each second convex portion and a diameter of each second concave portion.

17. The method of claim 16, wherein
the diameter of each second convex portion is larger than the diameter of each first convex portion, and
a height of each second convex portion is equal to about a height of each first convex portion.

18. The method of claim 17, wherein
the diameter of each first concave portion is larger than the diameter of each second concave portion, and
a depth of each first concave portion is larger than a depth of each second concave portion.

* * * * *